United States Patent
Lai

(10) Patent No.: US 9,610,211 B2
(45) Date of Patent: Apr. 4, 2017

(54) WALK ASSISTING APPARATUS INTEGRATING WALKER AND WALK ASSISTANT

(71) Applicant: TUNG TZU INDUSTRIAL CO., LTD., Tainan (TW)

(72) Inventor: Chin-I Lai, Tainan (TW)

(73) Assignee: Tung Tzu Industrial Co., Ltd., Tainan (TW)

( * ) Notice: Subject to any disclaimer, the term of this patent is extended or adjusted under 35 U.S.C. 154(b) by 6 days.

(21) Appl. No.: 14/794,239

(22) Filed: Jul. 8, 2015

(65) Prior Publication Data

US 2017/0007490 A1     Jan. 12, 2017

(51) Int. Cl.
*A47D 13/04*     (2006.01)
*A61H 3/00*      (2006.01)

(52) U.S. Cl.
CPC .......... *A61H 3/008* (2013.01); *A47D 13/046* (2013.01)

(58) Field of Classification Search
CPC ...... A61H 3/008; A47D 13/04; A47D 13/043; A47D 13/046
USPC ................................................... 280/87.051
See application file for complete search history.

(56) References Cited

U.S. PATENT DOCUMENTS

| 5,407,246 | A | * | 4/1995 | Meeker | A47D 13/107 248/372.1 |
| 5,441,289 | A | * | 8/1995 | Spielberger | A47D 13/04 135/67 |
| 5,813,720 | A | * | 9/1998 | Huang | A47D 13/043 280/87.051 |
| 6,231,056 | B1 | * | 5/2001 | Wu | A47D 1/02 280/1.188 |
| 6,474,659 | B1 | * | 11/2002 | Horchler | A63G 19/18 280/1.14 |
| 6,863,287 | B2 | * | 3/2005 | Myers | A47D 13/043 135/67 |
| 7,287,768 | B2 | * | 10/2007 | Myers | A47D 3/00 280/649 |
| D571,865 | S | * | 6/2008 | On | D21/424 |
| D587,764 | S | * | 3/2009 | Cheng | D12/130 |
| 8,016,305 | B2 | * | 9/2011 | Cheng | A47D 13/043 280/87.051 |
| D679,337 | S | * | 4/2013 | Lai | D12/133 |

(Continued)

FOREIGN PATENT DOCUMENTS

TW     M342812     10/2008

*Primary Examiner* — Hau Phan
*Assistant Examiner* — Jacob Meyer
(74) *Attorney, Agent, or Firm* — Muncy, Geissler, Olds & Lowe, P.C.

(57) ABSTRACT

A walk assisting apparatus integrating a walker and a walk assistant includes a first body, an elevated bracket connected to the first body, a second body connected to the elevated bracket in a detachable manner and a handgrip connected to the second body in a detachable manner. The first body includes a plurality of first wheels and a first frame. The elevated bracket includes two bracing arms and a loading tray. The second body includes a plurality of second wheels, a second frame and two wedge holes formed on the second frame. The handgrip includes a handgrip bar and two latch tenons connected to two ends of the handgrip bar corresponding to the wedge holes. The invention thus formed can be easily assembled and detached to serve as the walker or the walk assistant.

7 Claims, 14 Drawing Sheets

(56) References Cited

U.S. PATENT DOCUMENTS

| | | | | |
|---|---|---|---|---|
| D694,676 S * | 12/2013 | Lai | ................................ | D12/133 |
| 8,894,078 B2 * | 11/2014 | Brewin | ...................... | B62B 7/04 |
| | | | | 280/649 |
| 9,033,351 B2 * | 5/2015 | Sejnowski | ............ | A47D 13/043 |
| | | | | 280/47.34 |
| 9,192,247 B1 * | 11/2015 | Lu | ......................... | A47D 13/043 |
| D750,534 S * | 3/2016 | Lu | ................................ | D12/130 |
| 2010/0078909 A1 * | 4/2010 | Cheng | .................. | A47D 13/043 |
| | | | | 280/87.051 |

* cited by examiner

WALK ASSISTING APPARATUS INTEGRATING WALKER AND WALK ASSISTANT

FIELD OF THE INVENTION

The present invention relates to a walk assisting apparatus that integrates a walker and a walk assistant and particularly to a child walk assisting apparatus that is firmly structured and can be assembled and detached easily to serve as a walker or a walk assistant for children.

BACKGROUND OF THE INVENTION

Small children during the growing stage do not yet learn to control the leg forces skillfully, hence often fall down due to unstable gravity center. To prevent the small children from hazards during the period of learning to walk various ancillary products have been developed and marketed. In general, walk assisting means for children can be divided into a walker that encircles a child with a seat built on it and a walk assistant which can be gripped and pushed by the child for moving. The walker has a chassis with wheels mounted thereon and a seat for seating a child that also allows the child to extend the legs to touch ground surface so that the child can learn to walk and practice to use the strength of the legs. The walker encircles the child to avoid impact or falling down, and is suitable for a novice small child of little age. The walk assistant also has a chassis with wheels mounted thereon, and a handgrip at the upper side that can be gripped by the child's hands to provide a support force and move the walk assistant around, and can train the child to control balance during walking, hence is suitable to the child who has certain walking capability.

The conventional walker equipped with a seat and handpush walking assistant are formed with two individual and independent structures. Hence consumers have to purchase two different types of walk assisting products for the child at different walk learning stages. This not only takes more household space, also requires more expenses, hence is not economic effective. To remedy this problem Taiwan patent No. M342812 discloses a walker that also can serve as a walk assistant. It includes a detachable seat and a support frame which has an open end wedgeable in a rear end of a body frame. The support frame can be grasped by the hands of a child to function as a walk assistant. The chassis of such a walker has one side open. As a result the structure of the body is inadequate in strength at the rear side that could cause deformation, malfunction, or even hazard to the child during moving. Moreover, when the conventional walk assistant is in use the child has to move the entire set of the walk assistant. The size is bulky, and also is not suitable to be used in a small room. All this shows that there is still room for improvement.

SUMMARY OF THE INVENTION

The primary object of the present invention is to solve the problems of the prior technique of combining the walker and the walk assistant of insufficient structural strength and too bulky in size when used as the walk assistant.

To achieve the foregoing object the present invention provides a walk assisting apparatus integrating a walker and a walk assistant that includes a first body, an elevated bracket connected to the first body, a second body connected to the elevated bracket in a detachable manner, and a handgrip connected to the second body in a detachable manner. The first body includes a plurality of first wheels and a first frame connected to the first wheels and formed in an annular fashion. The elevated bracket includes two bracing arms and a loading tray to bridge the bracing arms. Each bracing arm has one end remote from the loading tray with a confining sleeve located thereon. The loading tray has one end remote from the confining sleeve with a latch slot formed thereon. The second body includes a plurality of second wheels, a second frame connected to the second wheels and leaning on the loading tray and the bracing arms, and two wedge holes formed on the second frame. The second frame includes a latch element latchable on the latch slot and two confining blocks that can be coupled respectively with the confining sleeve. The handgrip includes a handgrip bar and two latch tenons connected to two ends of the handgrip bar corresponding to the wedge holes.

In one aspect the second body includes a housing space to accommodate a child. The walk assisting apparatus further includes a seat in the housing space.

In another aspect the seat includes an inverse hook corresponding to the loading tray and two latch boards located at two sides of the seat. The second frame includes an inclined slot corresponding to the inverse hook and two latch blocks corresponding to the latch boards.

In yet another aspect each latch block has a sloped surface and each latch board has a latch hole latchable by the latch block.

In yet another aspect the walk assisting apparatus further includes an ornamental tray which has a plurality of ornaments movable with the first wheels and the second wheels of the walk assistant.

In yet another aspect the latch element includes a spring which is connected to the second frame and extended in normal conditions, a handle connected to the spring and a locking block connected to the handle and pressed by the spring to lean on the latch slot.

In yet another aspect each latch tenon includes an eccentric anchor rib.

Thus, the invention, compared with the prior technique, provides many advantages, notably:

1. The invention can be detached and assembled easily to serve as a walker or a walk assistant to suit children at different walk learning stages. Compared with the prior technique of having to buy two different walk assisting apparatus, the present invention can save space and expenses. Moreover, the second body can be removed from the elevated bracket, and the handgrip can be gripped by a child. Compared with the prior technique of having one open side at the chassis, the present invention is firmer, and safer than the conventional dual-purpose walk assisting apparatus when in use.

2. The second body can be detached to couple with the handgrip to serve as the walk assistant without the child to move the entire set of the walk assisting apparatus, hence can train the child to walk and play around even in a smaller room.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
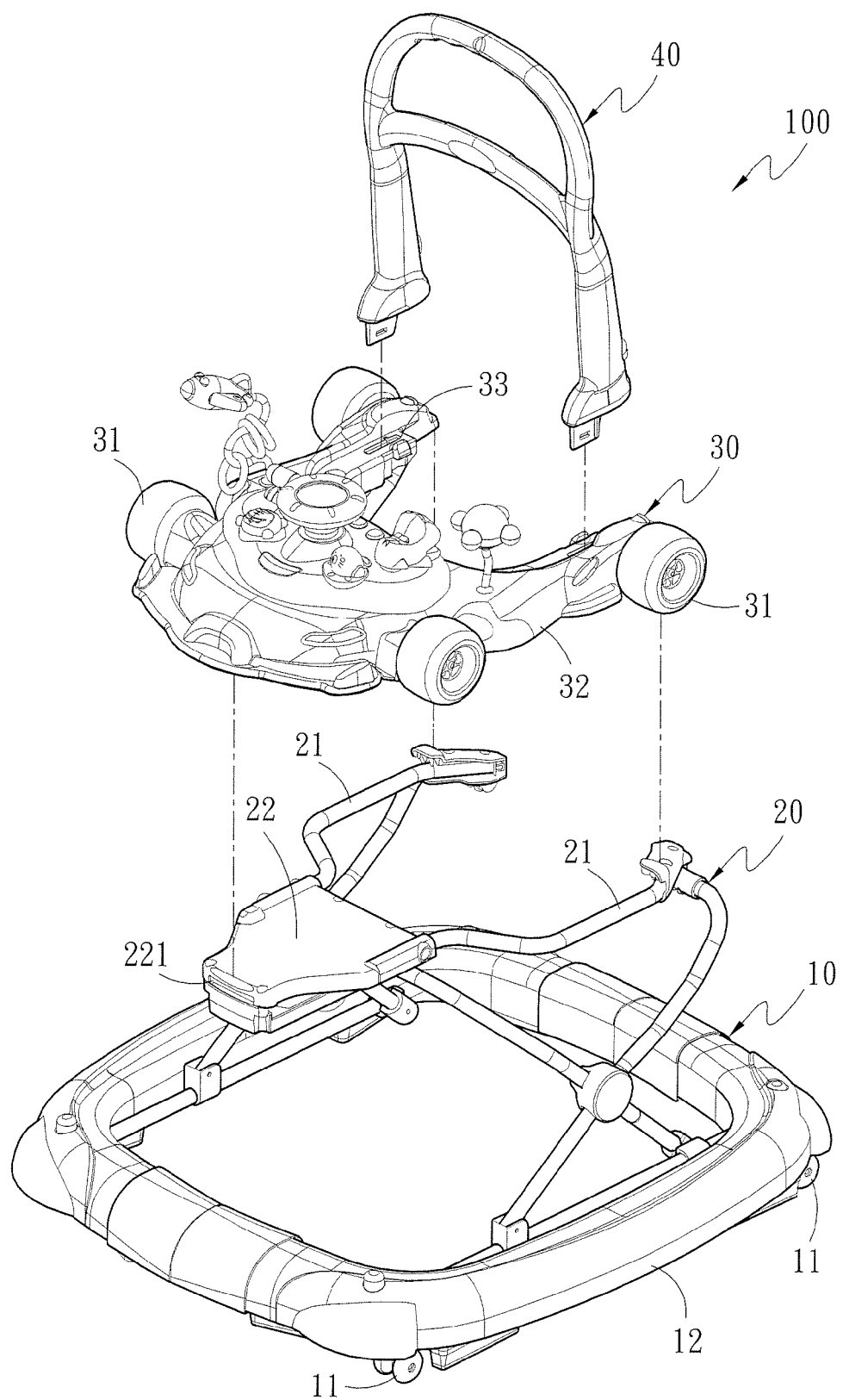
FIG. 1 is an exploded view of the walk assisting apparatus integrating a walker and a walk assistant according to the invention.
Figure 2A:
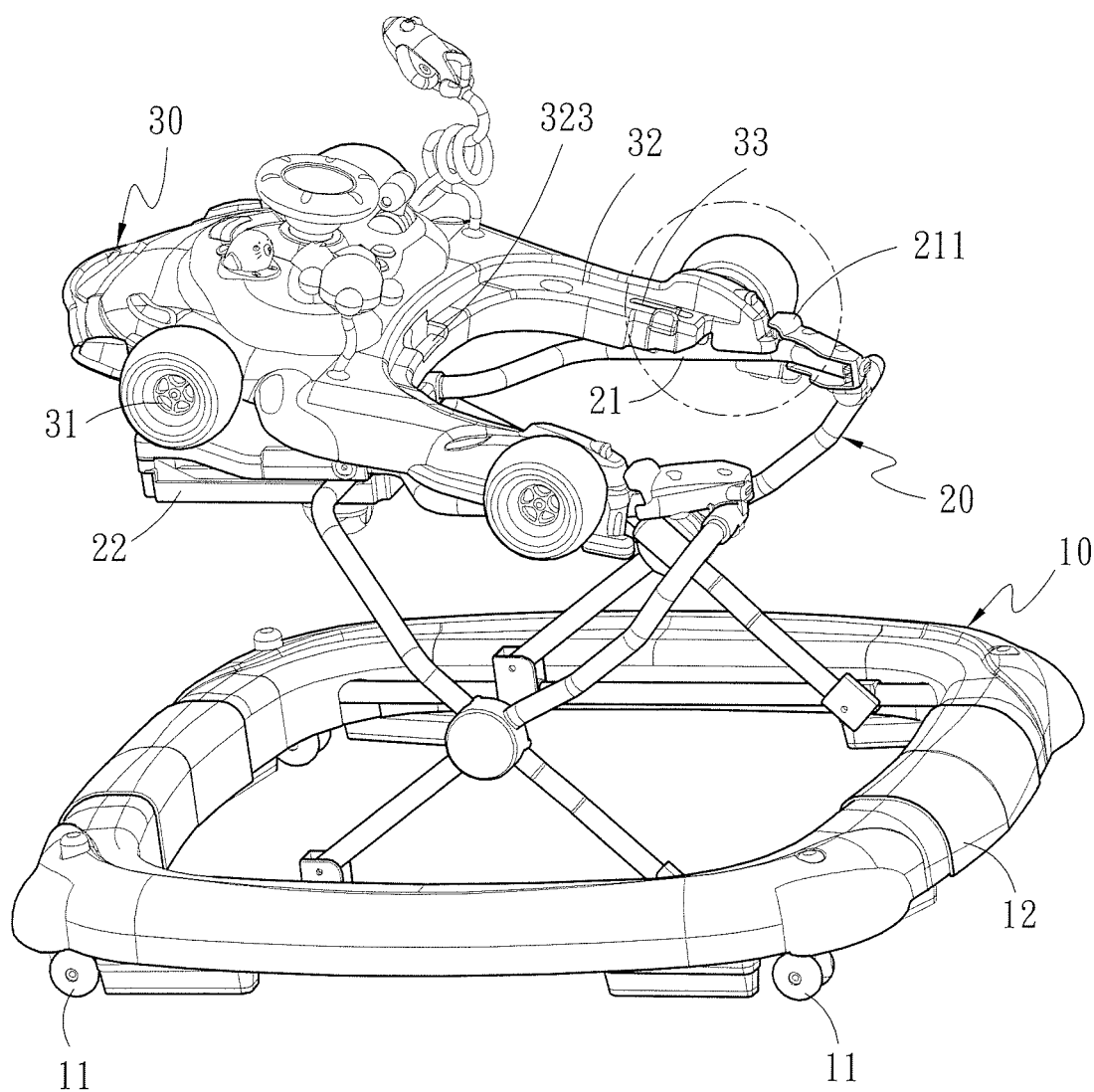
FIG. 2A is a schematic view of the first body and the second body of the invention in a coupled condition.
Figure 2B:
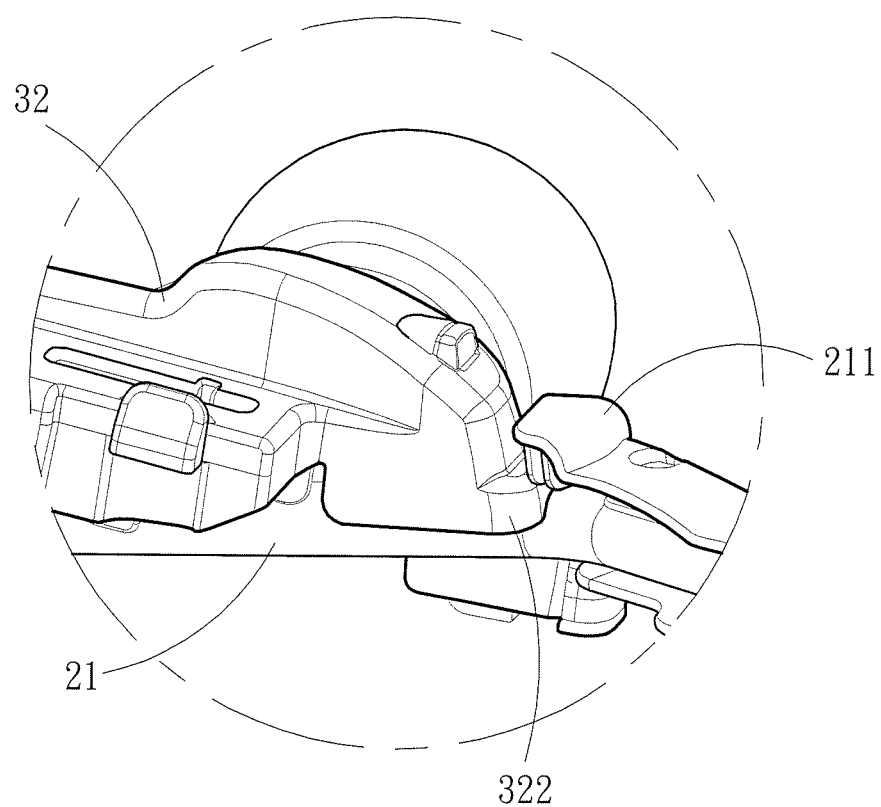
FIG. 2B is a fragmentary enlarged view according to FIG. 2A.

Please referring to FIGS. 1, 2A and 2B, the present invention aims to provide a walk assisting apparatus 100 that integrates a walker and a walk assistant. It includes a first body 10, an elevated bracket 20 connected to the first body 10, a second body 30 connected to the elevated bracket 20 in a detachable manner, and a handgrip 40 connected to the second body 30 in a detachable manner. Through assembly of the first body 10, the elevated bracket 20 and the second body 30 the walk assisting apparatus 100 can be constructed to become a walker, or through assembly of the second body 30 and the handgrip 40 the walk assisting apparatus 100 can be constructed to become a walk assistant, thereby the walk assisting apparatus 100 can be changed in varying styles to aid children to learn walking at different growing stages.

More specifically, the first body 10 includes a plurality of first wheels 11 and a first frame 12 connected to the first wheels 11 and formed in an annular fashion. The first frame 12 is formed in a full annular shape to become a structure with greater strength to provide sufficient support power and safety for the children when in use. The elevated bracket 20 includes two bracing arms 21 and a loading tray 22 to bridge the bracing arms 21. Each bracing arm 21 has one end remote from the loading tray 22 with a confining sleeve 211 located thereon. The loading tray 22 has one end remote from the confining sleeve 211 with a latch slot 221 formed thereon. The elevated bracket 20 is foldable to facilitate storing and save storage space. The second body 30 includes a plurality of second wheels 31, a second frame 32 connected to the second wheels 31 and leaning on the loading tray 22 and the bracing arms 21, and two wedge holes 33 formed on the second frame 32.

Figure 3:
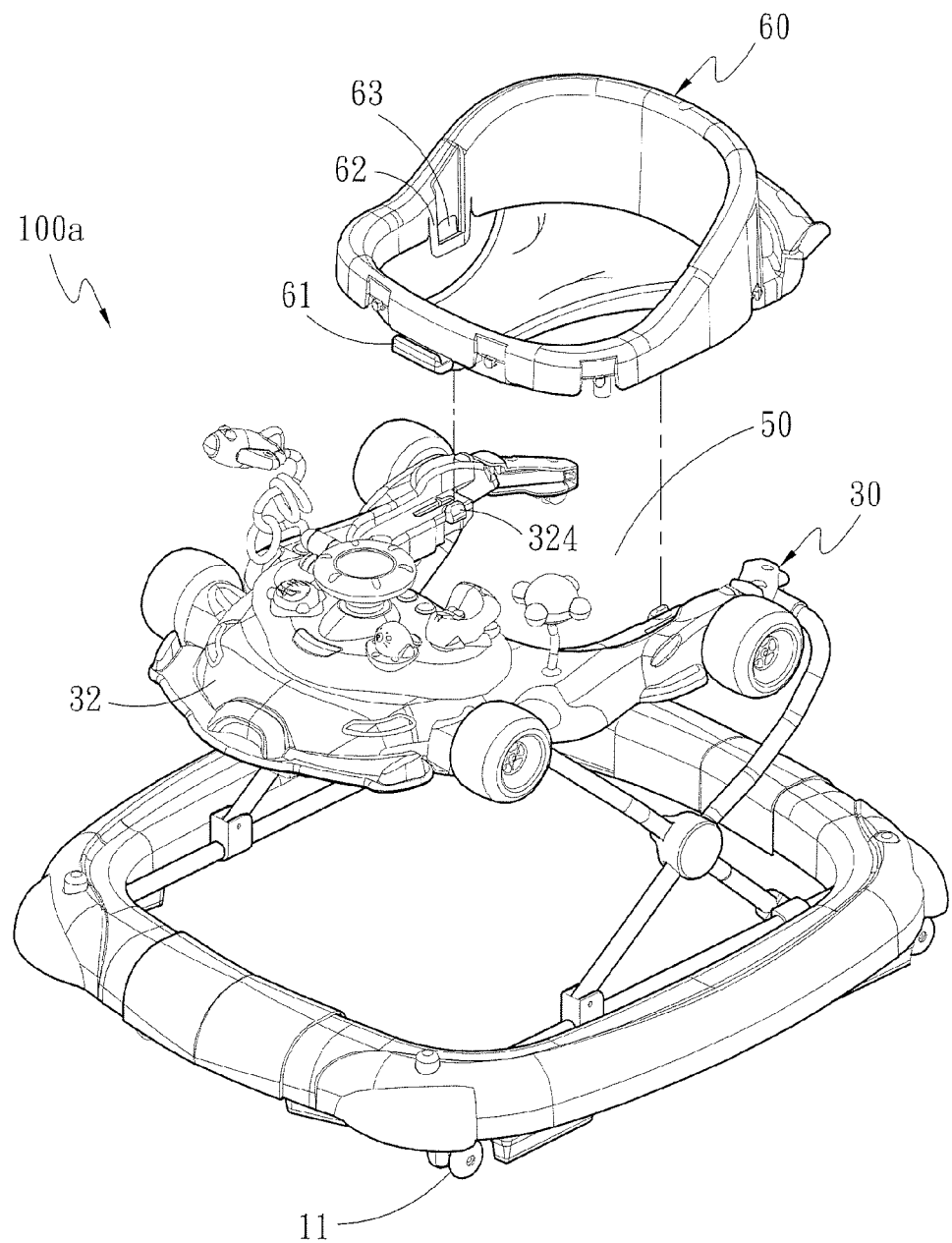
FIG. 3 is an exploded view of a first embodiment of the invention.

Also referring to FIG. 3, in this embodiment the walk assisting apparatus 100a is formed in a walker with a center space to allow a child to extend the legs to the ground surface and exert forces on the ground surface to move the walk assisting apparatus 100a, thereby can train the child to walk by using the legs.

Figure 4A:
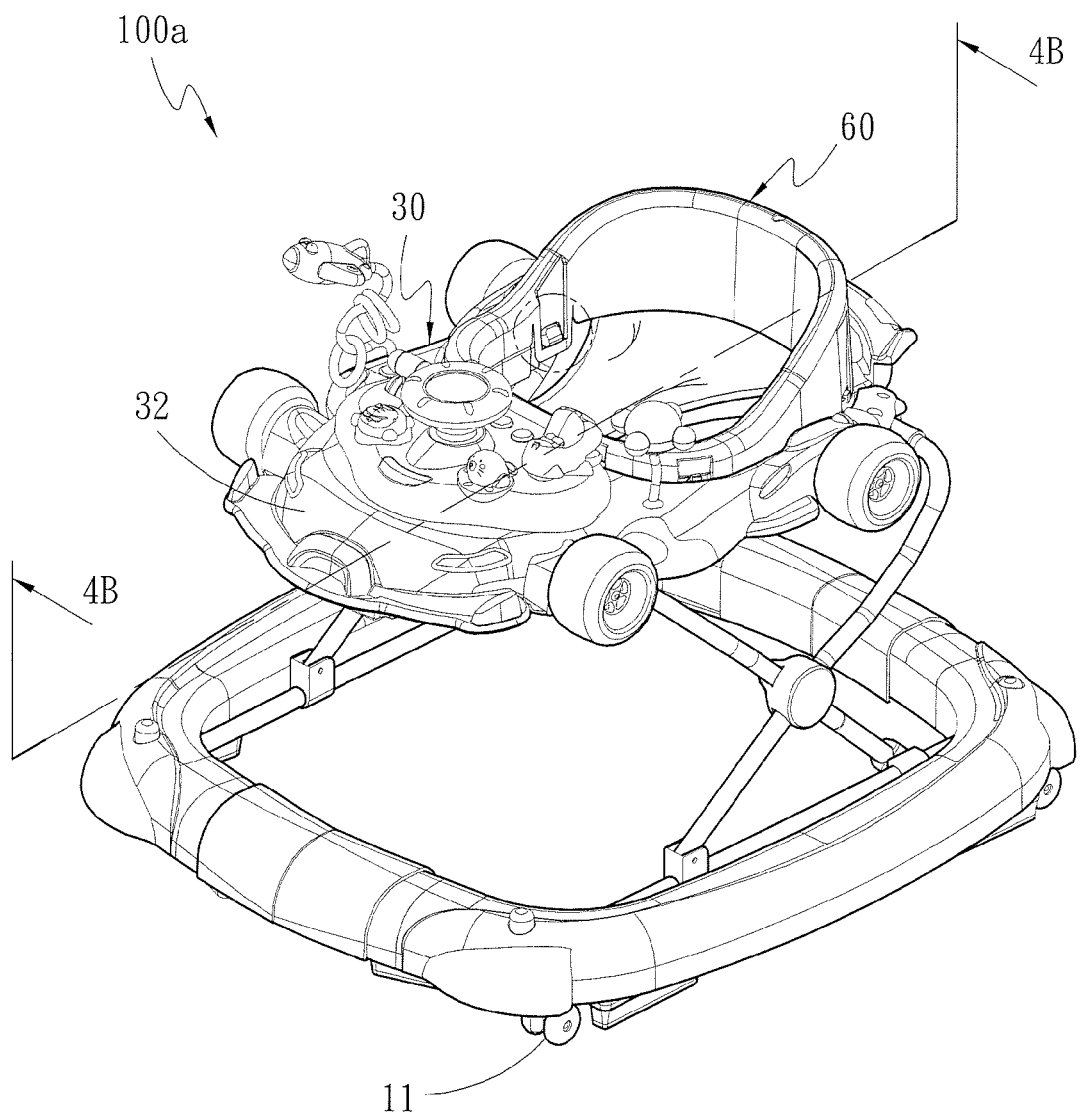
FIG. 4A is a perspective view of the first embodiment in an assembly condition.
Figure 4B:
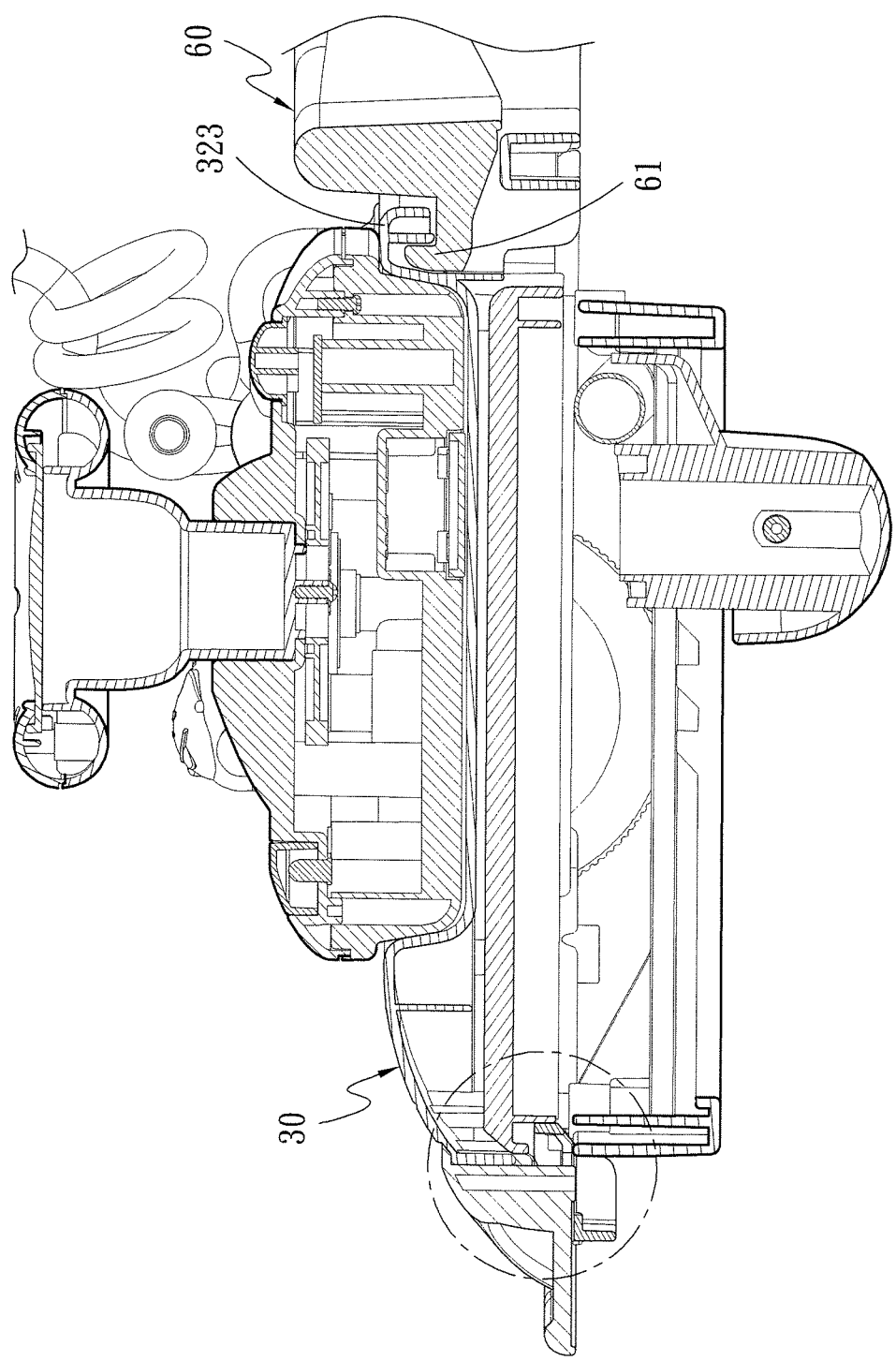
FIG. 4B is a sectional view taken on line 4B-4B in FIG. 4A.
Figure 4C:
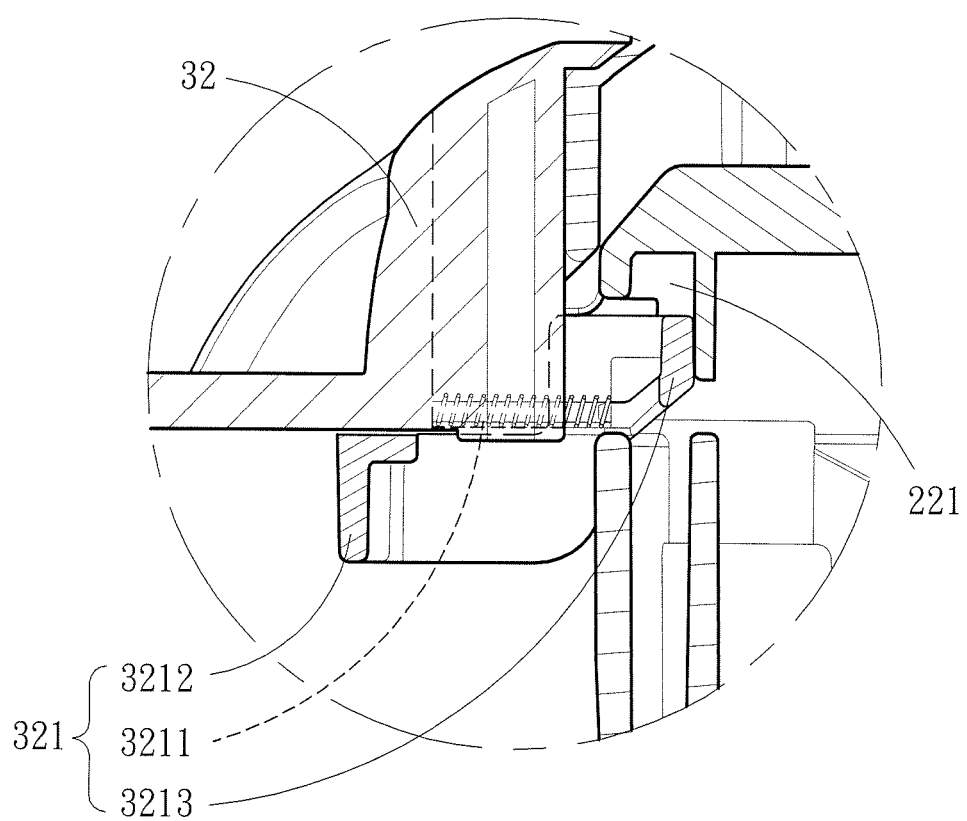
FIG. 4C is a fragmentary enlarged view according to FIG. 4B.
Figure 4D:
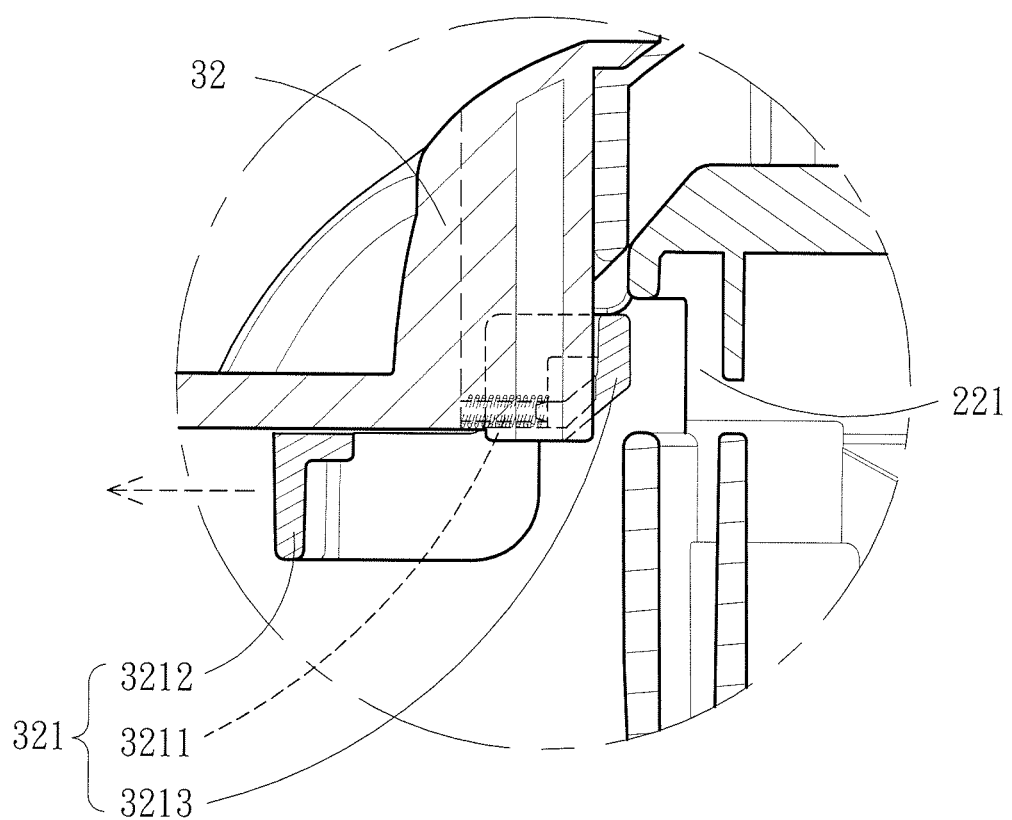
FIG. 4D is a schematic view of the latch slot and the latch element in an operating condition.
Figure 4E:
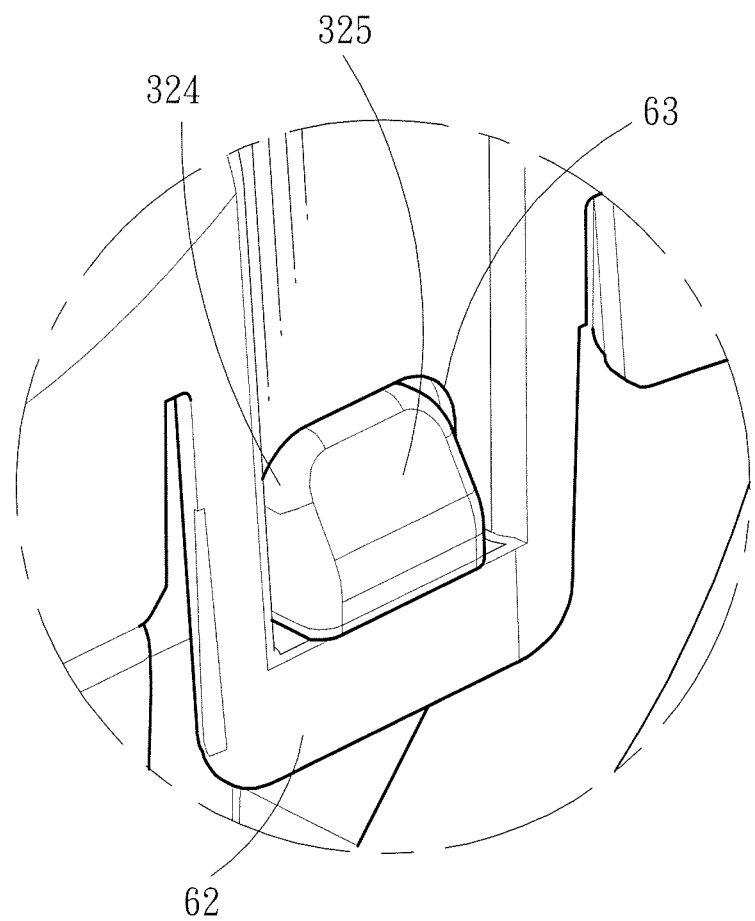
FIG. 4E is a fragmentary enlarged view according to FIG. 4A.

The second body 30 includes a housing space 50 to accommodate the child so that the child can be held in the housing space 50 to maneuver the walker to move. In this embodiment the walk assisting apparatus 100a is preferably to include a seat 60 in the housing space 50 to support the child before the child is not yet skillful in using the legs to exert the forces so that the child can extend the legs to the ground surface to slide the first wheels 11 in moving. Please referring to FIGS. 4A through 4D, the second frame 32 includes a latch element 321 latchable on the latch slot 221 and two confining blocks 322 that can be coupled respectively with the confining sleeve 211 (as shown in FIG. 2B). The latch element 321 includes a spring 3211 connected to the second frame 32 and extended in normal conditions, a handle 3212 connected to the spring 3211 and a locking block 3213 connected to the handle 3212 and pressed by the spring 3211 to lean on the latch slot 221. Referring to FIG. 4C, when the second body 30 and the elevated bracket 20 are coupled together the spring 3211 is extended to push the handle 3212 and position the locking block 3213 in the latch slot 221, then the second body 30 cannot be removed from the elevated bracket 20. Please referring to FIG. 4D, by drawing the handle 3212 to compress the spring 3211 the locking block 3213 can escape the latch slot 221, then the second body 30 can be removed from the elevated bracket 20. Through the aforesaid structure the first body 10, the elevated bracket 20 and the second body 30 can be easily assembled or detached. Also referring to FIGS. 3, 4A and 4E, furthermore, the seat 60 includes an inverse hook 61 corresponding to the loading tray 22 and two latch boards 62 at two sides of the seat 60. The second frame 32 includes an inclined slot 323 corresponding to the inverse hook 61 (also referring to FIG. 2A) and two latch blocks 324 corresponding to the latch boards 62. As shown in the drawings, each latch block 324 has a sloped surface 325, and each latch board 62 has a latch hole 63 latchable by each latch block 324. During installation of the seat 60 by inserting the inverse hook 61 into the inclined slot 323 (as shown in FIG. 4B) and push the seat 60 downward toward the first body 10, each latch board 62 can slide along the sloped surface 325 in a slightly bending manner, and when the latch hole 63 is corresponding to the latch block 324 the bending force of latch board 62 vanishes so that the latch block 324 can be wedged in the latch hole 63 to form latching, thereby installation can be accomplished simply and quickly.

Figure 5:
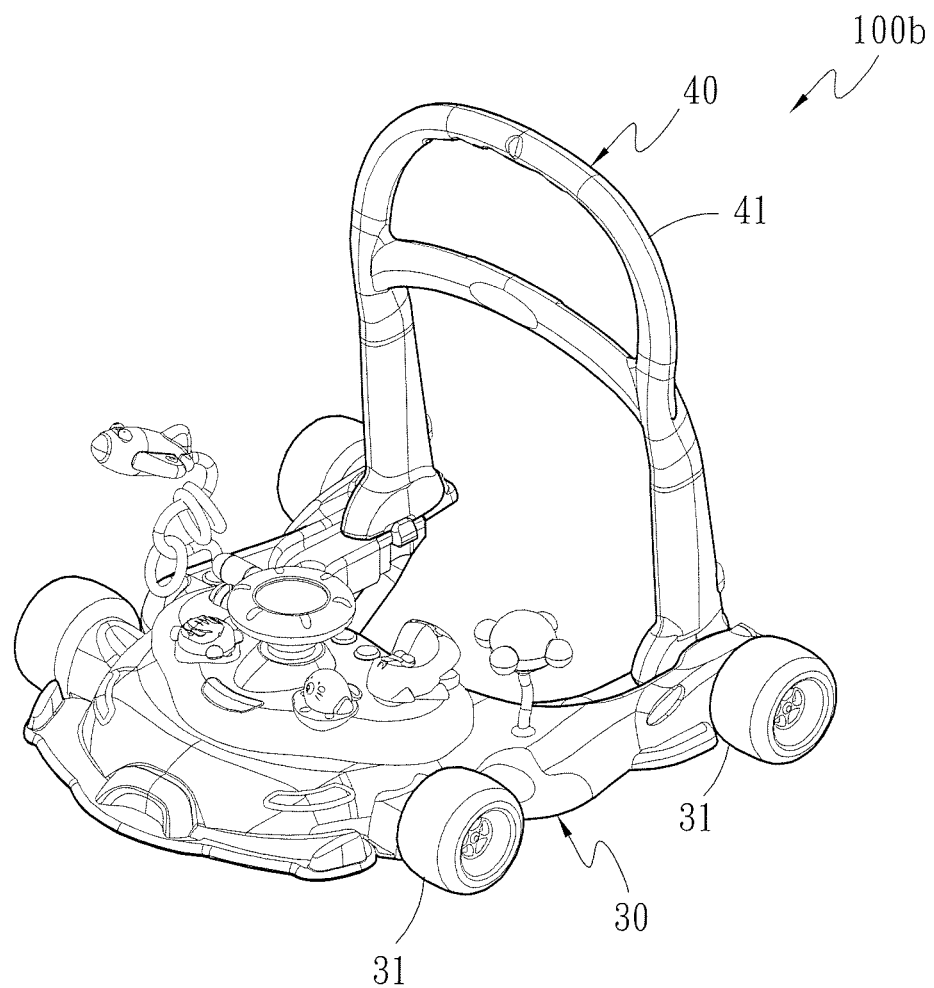
FIG. 5 is a perspective view of a second embodiment of the invention in an assembly condition.
Figure 6A:
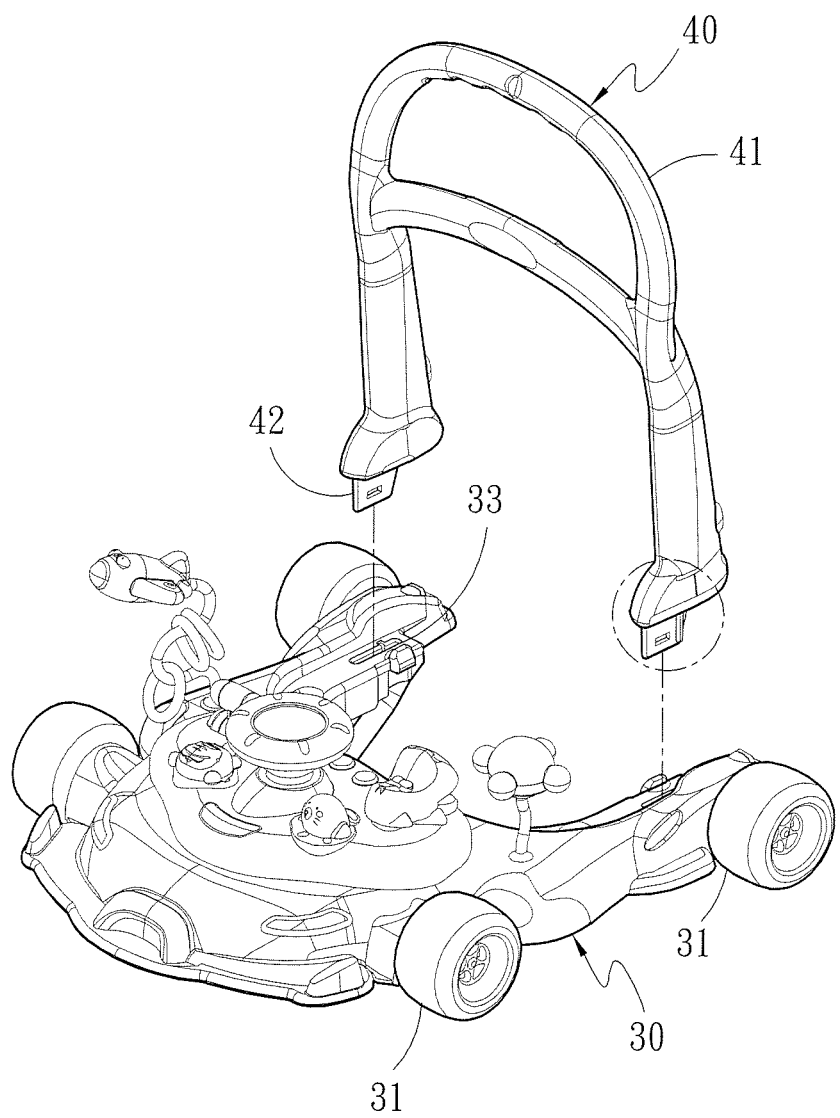
FIG. 6A is an exploded view of the second embodiment of the invention.
Figure 6B:
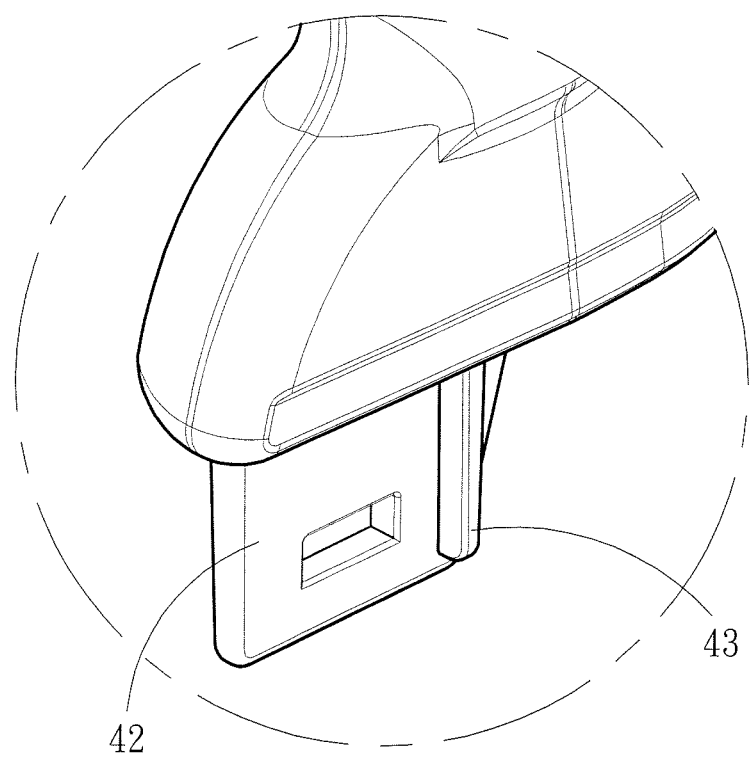
FIG. 6B is a fragmentary enlarged view according to FIG. 6B.

Please referring to FIGS. 5, 6A and 6B, in this embodiment the walk assisting apparatus 100b is formed in a walk assistant to allow a child to grasp the handgrip 40 and move the walk assisting apparatus 100b. Such a style is suitable for the child with sufficient leg development and walk capability to train the balance sense of the child during walking.

More specifically, the handgrip 40 includes a handgrip bar 41 and two latch tenons 42 connected to two ends of the handgrip bar 41 corresponding to the wedge holes 33. In one embodiment each latch tenon 42 includes an eccentric anchor rib 43, and each wedge hole 33 is formed in an asymmetrical shape corresponding to the latch tenon 42 and the anchor rib 43 so that the latch tenon 42 and the wedge hole 33 can be coupled only in a specific direction to provide fool-proof function.

Figure 7A:
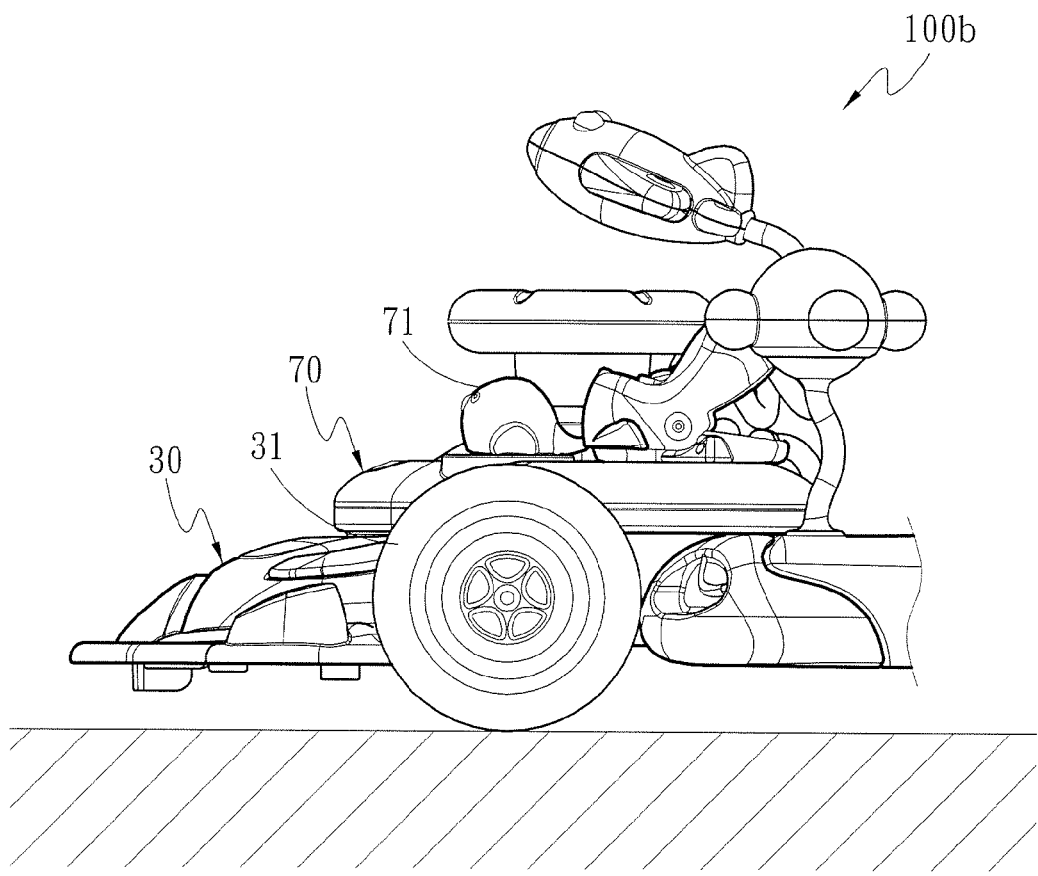
FIG. 7A is a side view of the walk assistant body and the ornamental tray of the invention.
Figure 7B:
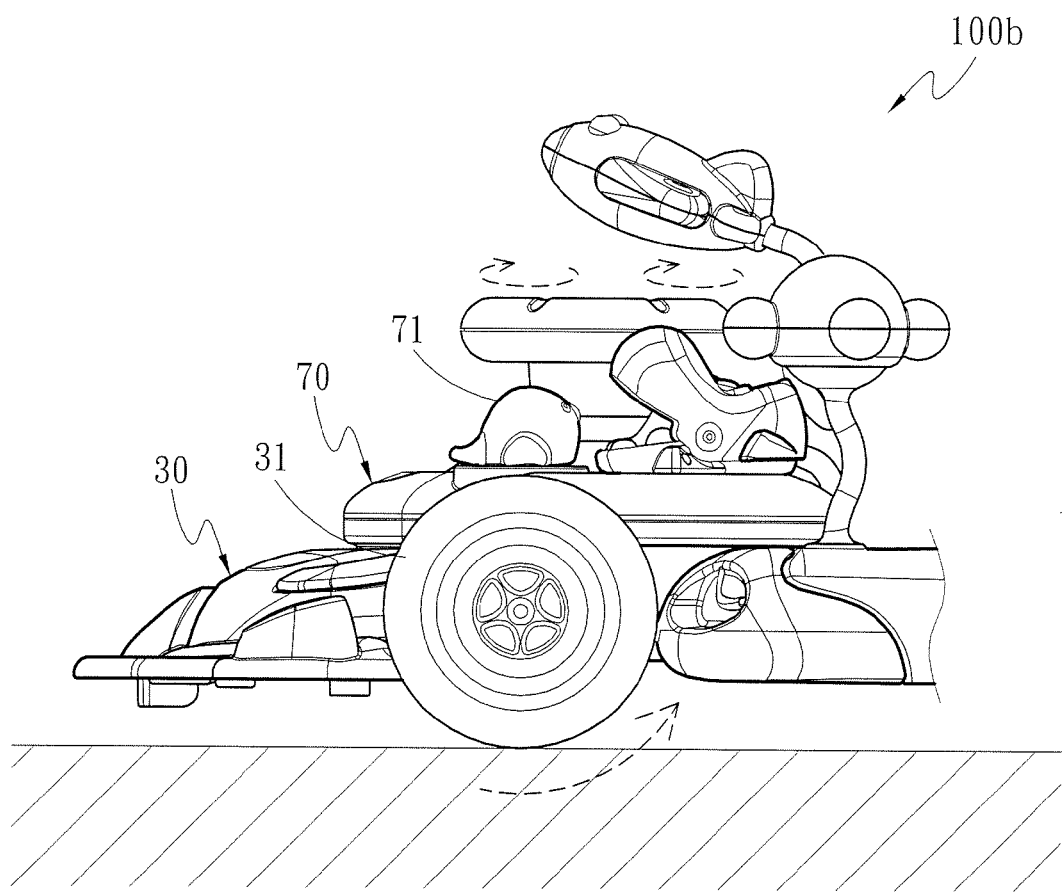
FIG. 7B is a schematic view of the walk assistant body and the ornamental tray of the invention in a use condition.

In addition, please referring to FIGS. 7A and 7B, in order to increase pleasure and motivation for the child to walk the walk assisting apparatus 100b can include an ornamental tray 70 with a plurality of ornaments 71 movable with the second wheels 31. The ornaments 71 can be figure toys in animal shapes or the like. The ornamental tray 70 and the second wheels 31 can be bridged by a transmission element such as a bevel gear (not shown in the drawings) to generate chain movements. When the child moves the walk assisting apparatus 100b the second wheels 31 rotate and drive the ornaments 71 on the ornamental tray 70 to rotate or move, thereby can motivate the child to practice walking.

What is claimed is:

1. A walk assisting apparatus integrating a walker and a walk assistant, comprising:
    a first body including a plurality of first wheels and a first frame connected to the first wheels and formed in an annular manner;
    an elevated bracket which is connected to the first body and includes two bracing arms and a loading tray bridging the two bracing arms, each bracing arm including a confining sleeve at one end remote from the loading tray, the loading tray including a latch slot at one end remote from the confining sleeve;
    a second body which is connected to the elevated bracket in a detachable manner and includes a plurality of second wheels, a second frame connected to the second wheels and leaning on the loading tray and the bracing arms, and two wedge holes located on the second frame, the second frame including a latch element latchable with the latch slot and two confining blocks coupled respectively with each confining sleeve; and
    a handgrip which is connected to the second body in a detachable manner and includes a handgrip bar and two latch tenons corresponding to one of the wedge holes, each of the tenons is connected to one end of the handgrip bar and the tenons are disposed at the opposite ends of the handgrip.

2. The walk assisting apparatus of claim 1, wherein the second body includes a housing space to accommodate a child, the walk assisting apparatus further including a seat located in the housing space.

3. The walk assisting apparatus of claim 2, wherein the seat includes an inverse hook corresponding to the loading tray and two latch boards respectively disposed at one side of the seat, wherein the two latch boards are disposed at the opposite sides of the seat, the second frame including an inclined slot corresponding to the inverse hook and two latch blocks corresponding to the two latch boards.

4. The walk assisting apparatus of claim 3, wherein each latch block comprises a sloped surface, and each latch board comprises a latch hole latchable by each latch block.

5. The walk assisting apparatus of claim 1 further including an ornamental tray which includes a plurality of ornaments movable with the second wheels of the walk assistant.

6. The walk assisting apparatus of claim 1, wherein the latch element includes a spring connected to the second frame and extended in normal conditions, a handle connected to the spring and a locking block connected to the handle and pressed by the spring to lean on the latch slot.

7. The walk assisting apparatus of claim 1, wherein each latch tenon includes an eccentric anchor rib.

* * * * *